United States Patent

Miyaoh et al.

[11] Patent Number: 5,333,884
[45] Date of Patent: Aug. 2, 1994

[54] GASKET WITH AUXILIARY ATTACHING MECHANISM

[75] Inventors: Yoshio Miyaoh; Minoru Nakaya, both of Tokyo, Japan

[73] Assignee: Ishikawa Gasket Co., Ltd., Tokyo, Japan

[21] Appl. No.: 990,945

[22] Filed: Dec. 14, 1992

Related U.S. Application Data

[63] Continuation of Ser. No. 775,529, Oct. 15, 1991, abandoned.

[30] Foreign Application Priority Data

Oct. 25, 1990 [JP]  Japan ................................ 2-111079

[51] Int. Cl.⁵ .............................................. F16J 15/10
[52] U.S. Cl. ................................. 277/235 B; 277/189
[58] Field of Search ..................... 277/9.5, 11, 235 B, 277/181, 166, 189

[56] References Cited

U.S. PATENT DOCUMENTS

| | | |
|---|---|---|
| 2,462,762 | 2/1949 | Nardin ................................ 277/11 |
| 2,867,464 | 11/1959 | Crampton ........................... 277/181 |
| 3,108,818 | 10/1963 | Furstenburg . | |
| 3,262,722 | 7/1966 | Gastineau ........................... 277/11 |
| 4,192,515 | 3/1980 | Smith . | |
| 4,524,979 | 6/1985 | Bauder ............................. 277/235 B |
| 4,650,227 | 3/1987 | Bauder et al. ..................... 277/189 |
| 4,813,687 | 3/1989 | Nakayama ....................... 277/235 B |
| 4,846,482 | 7/1989 | Blodgett et al. ................. 277/235 B |
| 5,044,641 | 9/1991 | Belter ............................. 277/235 B |

FOREIGN PATENT DOCUMENTS

| | | |
|---|---|---|
| 0617626 | 4/1961 | Canada ................................ 277/11 |
| 1001961 | 10/1952 | France . |
| 1338024 | 11/1973 | United Kingdom . |

Primary Examiner—William A. Cuchlinski, Jr.
Assistant Examiner—Daniel G. DePumpo
Attorney, Agent, or Firm—Kanesaka & Takeuchi

[57] ABSTRACT

A gasket of the invention is attached to an engine part for installing the gasket between the engine parts. The gasket is formed of a metal plate for constituting at least a part of the gasket, and at least two auxiliary attaching devices connected to the metal plate. The auxiliary attaching devices project outwardly from the metal plate. When the gasket is disposed on the engine part for attachment thereof, the auxiliary attaching devices are located adjacent to the engine part and hold the engine part to locate the gasket on the engine part.

11 Claims, 2 Drawing Sheets

GASKET WITH AUXILIARY ATTACHING MECHANISM

This application is a continuation of application Ser. No. 775,529, filed Oct. 15, 1991 now abandoned.

BACKGROUND OF THE INVENTION AND RELATED ART STATEMENT

The present invention relates to a gasket with an auxiliary attaching mechanism, so that the gasket can be fixed to a required portion on one of engine parts where the gasket is permanently installed.

A gasket is installed between two engine parts, such as between a cylinder head and a cylinder block, between a cylinder head and a manifold and so on, for sealing therebetween.

In case a gasket is installed between the cylinder head and the cylinder block, positioning pins are generally formed on the cylinder block, while the gasket is provided with positioning holes. The gasket can be properly positioned on the cylinder block by engaging the positioning holes of the gasket with the positioning pins on the cylinder block.

However, in case a manifold gasket is installed between the cylinder head and the manifold, there is no special positioning pins. Also, a gasket attaching surface of the cylinder head may not face upwardly. Sometimes, the gasket attaching surface is oriented sidewardly or downwardly. In these cases, the manifold gasket can not be simply located on the cylinder head, or on the manifold. Therefore, when the manifold gasket is installed, the manifold gasket must be held by a person installing the manifold.

In case a space or angle for installing the manifold is limited, it is very difficult to hold the manifold gasket on the cylinder head or the manifold and to fasten the manifold to the cylinder head. In some cases, one person can not install the manifold to the cylinder head by oneself.

As explained above, the cylinder block is provided with the positioning pins for aligning the gasket and the cylinder head. However, there is no means for aligning the gasket on the engine part or for temporarily attaching the gasket on the engine part. Especially, there is no means integrally formed with a gasket for attaching the gasket on one of the engine parts so that the gasket can be easily fixed to the engine part in case the gasket attaching portion orients sidewardly or downwardly or the gasket is moved together with the engine part for attachment.

Accordingly, one object of the invention is to provide a gasket with an auxiliary attaching mechanism, wherein the gasket can be attached to an appropriate position on one of engine parts for installing the engine parts together.

Another object of the invention is to provide a gasket as stated above, wherein the gasket can be securely attached to the engine part even if the engine part is moved.

A further object of the invention is to provide a gasket as stated above, wherein the gasket can be easily and economically manufactured.

Further objects and advantages of the invention will be apparent from the following description of the invention.

SUMMARY OF THE INVENTION

In accordance with the present invention, the gasket is attached to an engine part for installing the gasket between engine parts. The gasket comprises a metal plate for constituting at least a part of the gasket, and at least two auxiliary attaching devices connected to an outer edge of the metal plate.

The auxiliary attaching devices project outwardly from the metal plate. When the gasket is disposed on the engine part for attachment, the auxiliary attaching devices are located adjacent to the engine part and resiliently hold the engine part to locate the gasket on the engine part.

Since the gasket is firmly attached to one of the engine parts, such as a cylinder head or a manifold, even if a gasket attaching surface of the engine part does not orient upwardly, the gasket does not fall from the engine part. The gasket can be situated properly between the two engine parts and can be securely fixed therebetween by regular connecting means, such as bolts. The auxiliary attaching devices need not be removed after the two engine parts are connected together.

The metal plate includes at least one first hole to be sealed, and at least two bolt holes situated near the first hole. The auxiliary attaching devices are located away from the bolt holes not to affect bolts inserted into the bolt holes.

In case the metal plate includes a plurality of first holes to be sealed and at least one connecting portion between the first holes adjacent to each other, the auxiliary attaching devices may be formed at the connecting portion.

The auxiliary attaching device is formed of a metal member, preferably a resilient metal member, engaging the engine part. Preferably, the two metal members hold the engine part to locate the gasket on the engine part. Also, each metal member may include a projection facing the engine part when installed. As a result, the projections firmly engage the engine part.

The gasket may be formed of one metal plate, or a plurality of metal plates for constituting a steel laminate gasket. Also, the gasket may be formed of one metal plate laminated with other gasket material, such as a binder (rubber or resin) with fibers or graphite. The metal plate may be a core of the gasket or may not extend the entire area of the gasket.

DETAILED DESCRIPTION OF PREFERRED EMBODIMENTS

Figure 1:
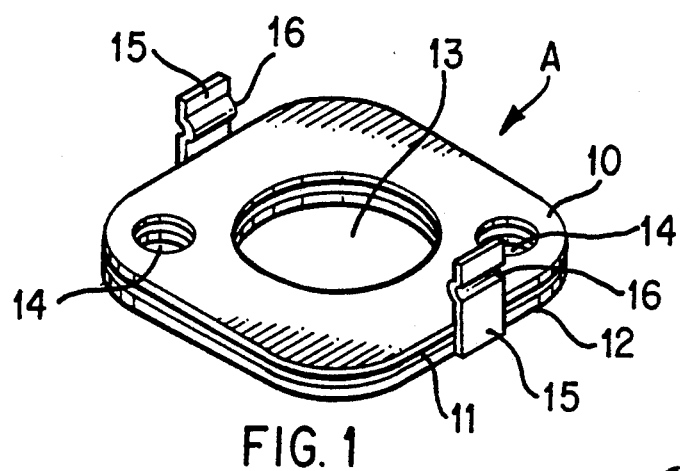
FIG. 1 is a perspective view of a first embodiment of a gasket of the invention.
Figure 2:
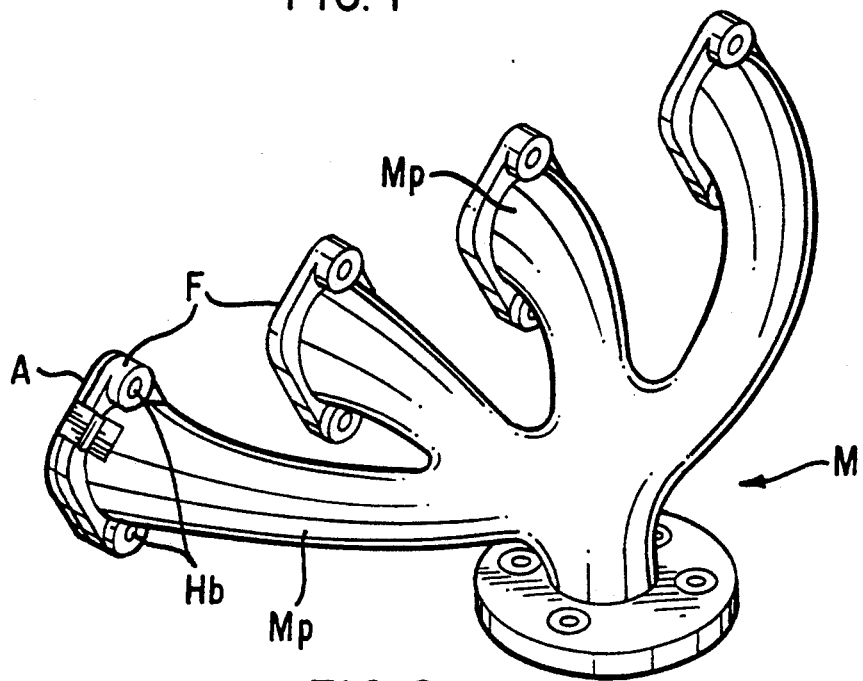
FIG. 2 is an explanatory perspective view for showing that one gasket is attached to a manifold.

Referring to FIGS. 1 and 2, a first embodiment A of a gasket of the present invention is shown. The gasket A is a manifold gasket, which is installed between a cylinder head (not shown) and each manifold pipe Mp of a manifold M.

The gasket A is formed of two outer metal plates 10, 12 and a middle member 11, and includes a central hole 13 and two bolt holes 14. The central hole 13 corresponds to an inner diameter of the manifold pipe Mp, and the bolt holes 14 correspond to bolt holes Hb at a flange F of the manifold M.

The metal plate 12 is provided with two engaging members 15 extending outwardly from the metal plate 12. Each engaging member 15 includes a projection 16 extending toward the central hole 13. The projections 16 engage edges of the flange F when the gasket A is installed on the flange F.

The metal plates 10, 12 may be any kind of metal, but preferably, the metal plate 12 has resiliency to provide resiliency at the engaging members 15. In case the engaging members 15 have resiliency, the gasket A can be securely attached to the flange F of the manifold M when installed.

The middle member 11 is formed of a gasket material including a binder and organic fibers. The gasket material must be strong against heat. The metal plates 10, 12 and the middle member 11 are joined together by glue. However, the metal plates 10, 12 and the middle member 11 may be joined by any means, such as spot welding between the metal plates 10, 12, a grommet covering the metal plates 10, 12 and so on.

When the gasket A is installed on the flange F of the manifold pipe Mp of the manifold M, the gasket A is simply pushed onto the flange F. The projections 16 engage the flange F to prevent the gasket A from disengaging from the manifold pipe Mp.

In the gasket A, the gasket A is secured to the flange F of the manifold M. Therefore, even if a gasket attaching surface of the cylinder head orients sidewardly or downwardly, the gasket A is securely attached onto the flange F and is moved together with the manifold M to be installed between the flange F and the cylinder head.

In the gasket A, the gasket A is attached to the manifold M. However, if there is a flange near the gasket attaching surface of the cylinder head, the gasket A may be attached to the cylinder head. The manifold M is fixed to the cylinder head by bolts (not shown) while the gasket is attached to the cylinder head or manifold by the engaging members.

Figure 3:
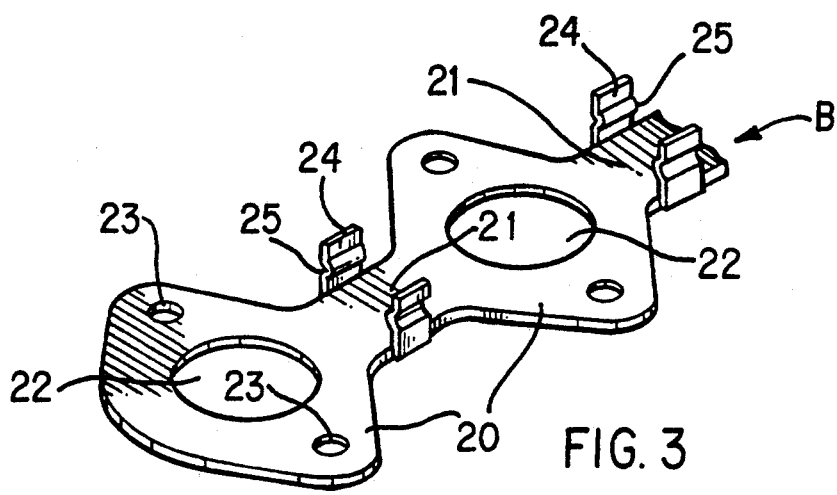
FIG. 3 is a perspective view of a part of a second embodiment of a gasket of the invention.
Figure 4:
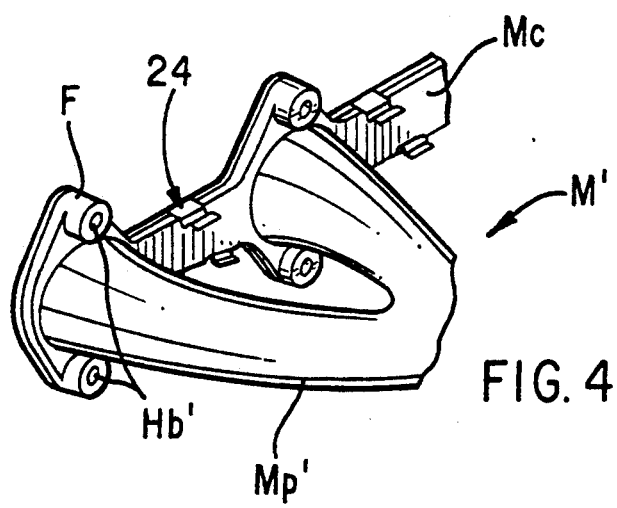
FIG. 4 is an explanatory perspective view for showing that the gasket as shown in FIG. 3 is attached to a manifold.

FIGS. 3 and 4 show a second embodiment B of a manifold gasket of the invention. The gasket B is designed to be installed on a manifold M' having connecting portions Mc between the flanges F of the manifold pipes Mp'.

The gasket B is made of one metal plate, and is formed of a plurality of gasket portions 20 and connecting portions 21 for integrally connecting the gasket portions 20. Each gasket portion 20 includes a hole 22 corresponding to a hole of a manifold pipe Mp' and two bolt holes 23 for bolt holes Hb'. Engaging members 24 with projections 25 are formed at the connecting portions 21 to face with each other.

When the gasket B is installed on the manifold M', the gasket B is aligned with the manifold M' and is pushed so that the engaging members 24 hold the connecting portions Mc. As a result, the gasket B is securely attached to the manifold M'. The gasket B operates as in the gasket A.

Figure 5:
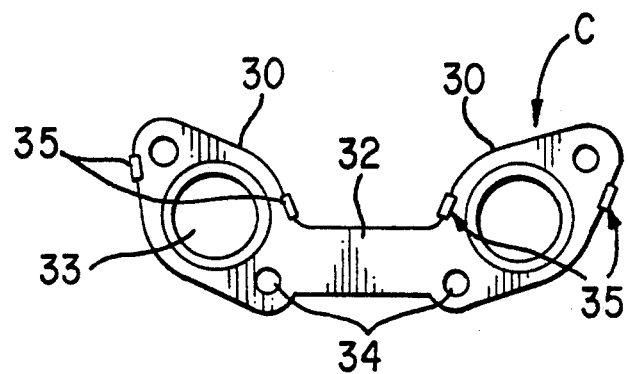
FIG. 5 is a plan view of a third embodiment of the gasket of the invention.

FIG. 5 shows a third embodiment C of the gasket of the invention. In the gasket B, a plurality of the engaging members 24 is connected by the connecting portions 21, but in the gasket C, two gasket portions 30 are integrally connected by one connecting portion 32. The gasket C is formed of one metal plate, and each gasket portion 30 is provided with a hole 33 and two bolt holes 34. Engaging members 35 as in the engaging members 15 and 24 are formed on the gasket portions 30.

The gasket C is installed in a manifold similar to the manifold M shown in FIG. 2. In the gasket C, since the two gasket portions 30 are connected together, handling of the gasket portions 30 is facilitated.

Figure 6:
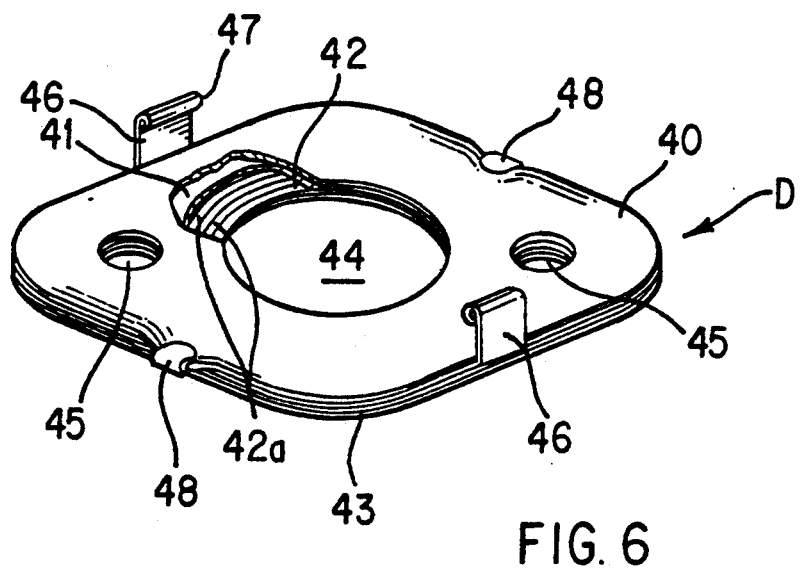
FIG. 6 is a partly broken perspective view of a fourth embodiment of the gasket of the invention.

FIG. 6 shows a fourth embodiment D of the manifold gasket of the invention. The gasket D is a steel laminate gasket and is formed of an upper plate 40, two middle plates 41, 42 and a lower plate 43. The plates 40, 41, 42, 43 have central holes 44 and bolt holes 45.

The middle plate 41 includes engaging members 46 with projections 47, and the middle plate 42 includes two beads 42a around the hole 44 for sealing therearound. The lower plate 43 has two flaps 48 turning over the upper plate 40, so that the plates 40, 41, 42, 43 are connected together without spot welding. The gasket D operates as in the gasket A.

In the present invention, the gasket is provided with the engaging members, which engage an engine part that the gasket is installed. Therefore, when the gasket is installed between the engine parts, the gasket is attached to one of the engine parts. Consequently, the gasket can be easily installed between the two engine parts regardless of the location or angle of a gasket attaching surface of the engine parts.

While the invention has been explained with reference to the specific embodiments of the invention, the explanation is illustrative and the invention is limited only by the appended claims.

What is claimed is:

1. A manifold gasket engageable to a manifold having a plurality of holes, flanges formed around the respective holes, manifold bolt holes formed in the flanges near corners opposite to each other, and at least one manifold connecting portion for connecting adjacent two flanges, comprising, a metal plate for constituting at least a part of the gasket, and having a plurality of gasket portions, each gasket portion having an outer edge corresponding to an outer configuration of each flange of the manifold, a plurality of first holes formed in the gasket portions to be sealed therearound and corresponding to the holes of the manifold, gasket bolt holes situated near the respective first holes to correspond to the manifold bolt holes, and at least one gasket connecting portion for connecting adjacent two gasket portions with each other, said gasket connecting portion corresponding to the manifold connecting portion and having side edges, and at least two auxiliary attaching devices integrally connected to the side edges of the gasket connecting portion, said auxiliary attaching devices projecting outwardly from the gasket connecting portion so that when the gasket is pushed onto the manifold for attachment, the auxiliary attaching devices engage the manifold connecting portion to locate the gasket on the manifold without directly engaging to the flanges of the manifold.

2. A gasket according to claim 1, wherein the gasket is formed of a plurality of metal plates to constitute a steel laminate gasket.

3. A gasket according to claim 1, wherein each auxiliary attaching device includes a main portion extending substantially perpendicularly to the gasket connecting portion and a projection extending from the main portion to orient inwardly of the gasket connecting portion, said projections of the two auxiliary attaching devices being located behind the manifold connection portion to securely attach the gasket to the manifold.

4. A gasket according to claim 3, wherein said projection is formed by bending a part of the main portion.

5. A gasket according to claim 4, wherein each auxiliary attaching device further includes an upper end portion located in a plane of the main portion, said projection extending between the main portion and the upper end portion.

6. A manifold gasket engageable to a manifold having a rectangular shape with rounded corners, a central hole, a flange formed around the central hole and two bolt holes formed in the flange near two corners opposite to each other, comprising, a metal plate for constituting at least a part of the gasket and having a rectangular shape with rounded corners and four straight edges, a first hole to be sealed therearound and corresponding to the central hole, and two bolt holes situated near two rounded corners opposite to each other, and two auxiliary attaching devices integrally connected to the straight edges of the metal plate substantially facing against each other and being formed of resilient metal members, said auxiliary attaching devices being located away from the bolt holes not to affect bolts inserted in the bolt holes and projecting outwardly from the metal plate, each resilient metal member having a projection extending inwardly from the edge of the metal plate so that when the gasket is disposed on and pushed over the manifold for attachment, the auxiliary attaching devices are located at a side of the flange and the projections are located behind the flange to firmly hold the gasket on the manifold.

7. A gasket according to claim 6, wherein each auxiliary attaching device includes a main portion extending substantially perpendicularly to the metal plate, said projection extending from the main portion to orient inwardly of the metal plate.

8. A gasket according to claim 7, wherein said projection is formed by bending a part of the main portion.

9. A gasket according to claim 8, wherein each auxiliary attaching device further includes an upper end portion located in a plane of the main portion, said projection extending between the main portion and the upper end portion.

10. A gasket according to claim 6, wherein a gasket assembly consists of said two metal plates with auxiliary attaching devices and one gasket connecting portion for connecting said two metal plates together to constitute one assembly.

11. A combination of a manifold gasket and a manifold, comprising, said manifold including a plurality of holes, flanges formed around the respective holes, manifold bolt holes formed in the respective flanges near corners opposite to each other, and at least one manifold connecting portion for connecting adjacent two flanges, said manifold gasket including a metal plate for constituting at least a part of the gasket and at least two auxiliary attaching devices, said metal plate including a plurality of gasket portions, each gasket portion having an outer edge corresponding to an outer configuration of each flange of the manifold, a plurality of first holes formed in the gasket portions to be sealed therearound and corresponding to the holes of the manifold, gasket bolt holes situated near the respective first holes to correspond to the manifold bolt holes, and at least one gasket connecting portion for connecting adjacent two gasket portions with each other, said gasket connecting portion corresponding to the manifold connecting portion and having side edges, and said auxiliary attaching devices being integrally connected to the side edges of the gasket connecting portion, said auxiliary attaching devices projecting outwardly from the gasket connecting portion so that when the gasket is pushed onto the manifold for attachment, the auxiliary attaching devices engage the manifold connecting portion to locate the gasket on the manifold without directly engaging to the flanges of the manifold.

* * * * *